United States Patent [19]

Tura et al.

[11] Patent Number: 5,419,982
[45] Date of Patent: May 30, 1995

[54] CORNER TAB TERMINATION FOR FLAT-CELL BATTERIES

[75] Inventors: Drew D. Tura, Santa Clara, Calif.; Douglas V. Garland, Indianapolis; Jeffrey J. Ronning, Fishers, both of Ind.; Bernard R. Gandler, San Jose, Calif.

[73] Assignee: Valence Technology, Inc.

[21] Appl. No.: 163,204

[22] Filed: Dec. 6, 1993

[51] Int. Cl.⁶ .............................................. H01M 2/30
[52] U.S. Cl. ...................................... 429/162; 429/178
[58] Field of Search ......... 429/160, 152, 178, 179–211

[56] References Cited

U.S. PATENT DOCUMENTS

| | | | |
|---|---|---|---|
| 3,734,780 | 5/1973 | Bilhorn et al. | 429/162 |
| 4,751,150 | 6/1988 | Oogita et al. | 429/1 |
| 4,929,518 | 5/1990 | Yoshinaka et al. | 429/178 X |
| 4,997,732 | 3/1991 | Austin et al. | |
| 5,017,441 | 5/1991 | Lindner . | |
| 5,102,753 | 4/1992 | Rossoll | 429/62 X |
| 5,230,967 | 7/1993 | Radmall | 429/152 |
| 5,362,579 | 11/1994 | Rossoll | 429/162 |

*Primary Examiner*—Anthony Skapars
*Attorney, Agent, or Firm*—James S. Hsue

[57] ABSTRACT

A new flat cell battery design is provided which incorporates a cathode and an anode terminal which are located in respective corners of a battery body. By locating the cathode and anode terminals in respective corners of the flat cell battery, the storage capacity and energy density of the battery are increased compared to conventional flat cell batteries. The corner terminal design of the present invention significantly improves packaging efficiency over common-edge terminals. In addition to increased volume efficiency, corner terminals improve thermal and electrical distribution properties of the battery. Physical separation of the terminals to adjacent or opposite corners also reduces the probability of inadvertent external short-circuit, resulting in improved safety.

10 Claims, 6 Drawing Sheets

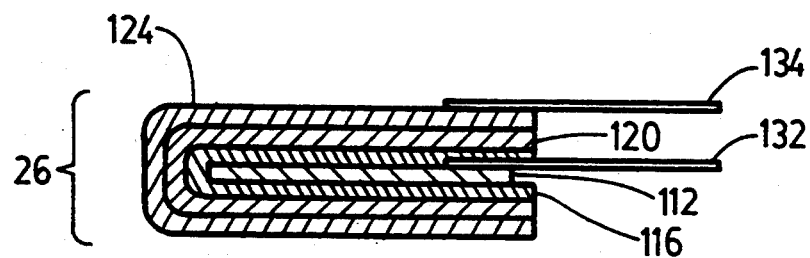
FIG._1.
(PRIOR ART)
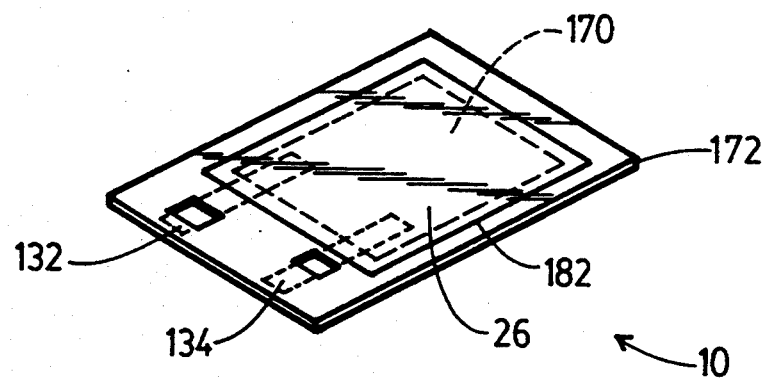
FIG._2.
(PRIOR ART)

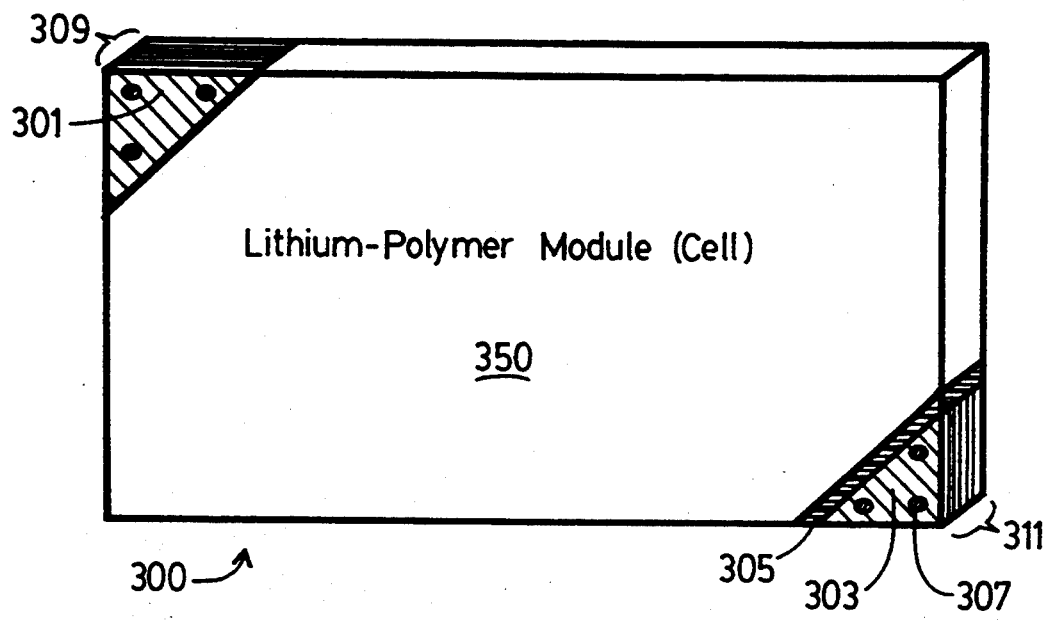
FIG._3.
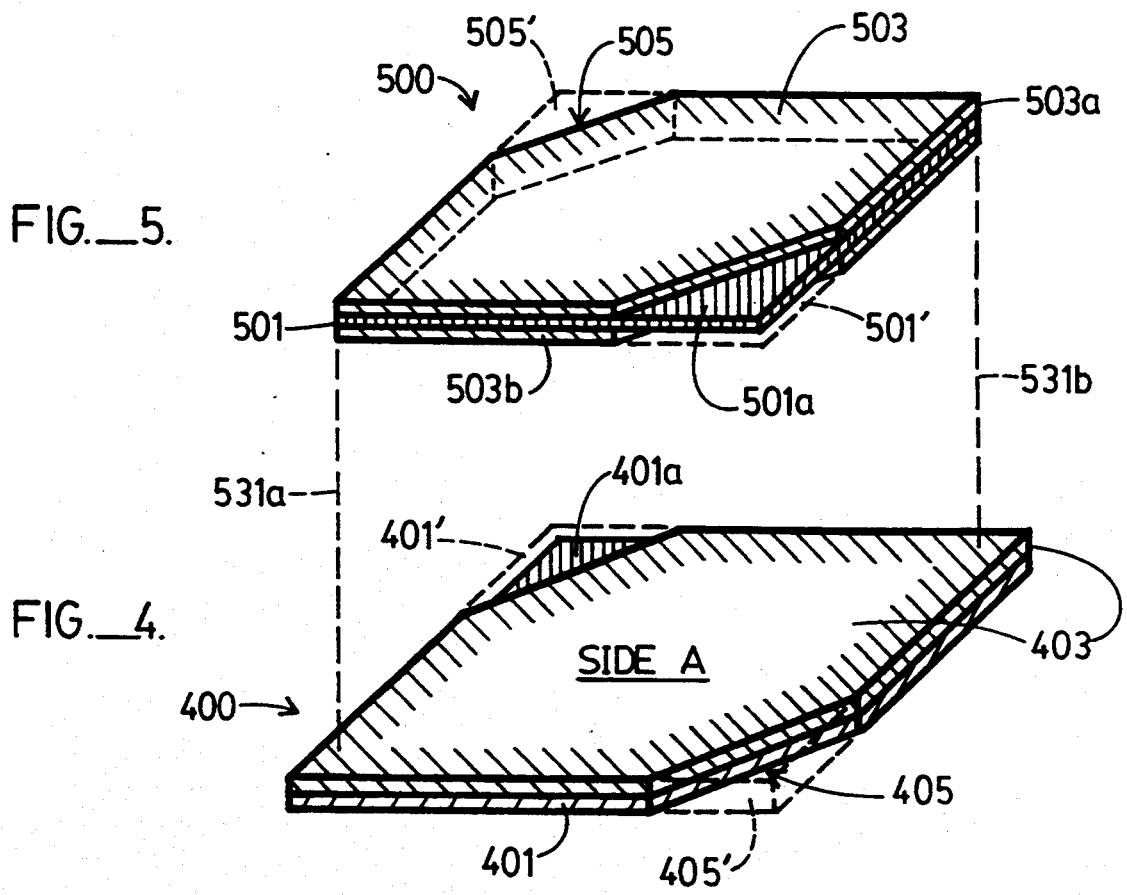
FIG._5.
FIG._4.

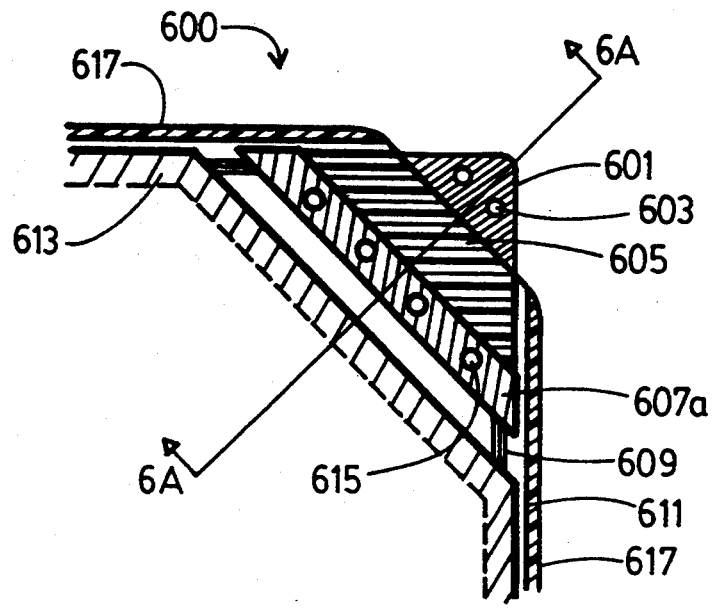
FIG._6.
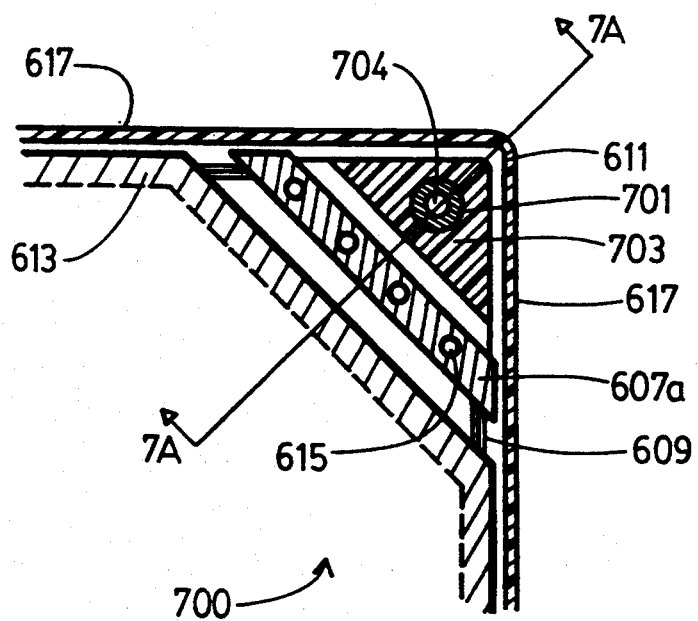
FIG._7.

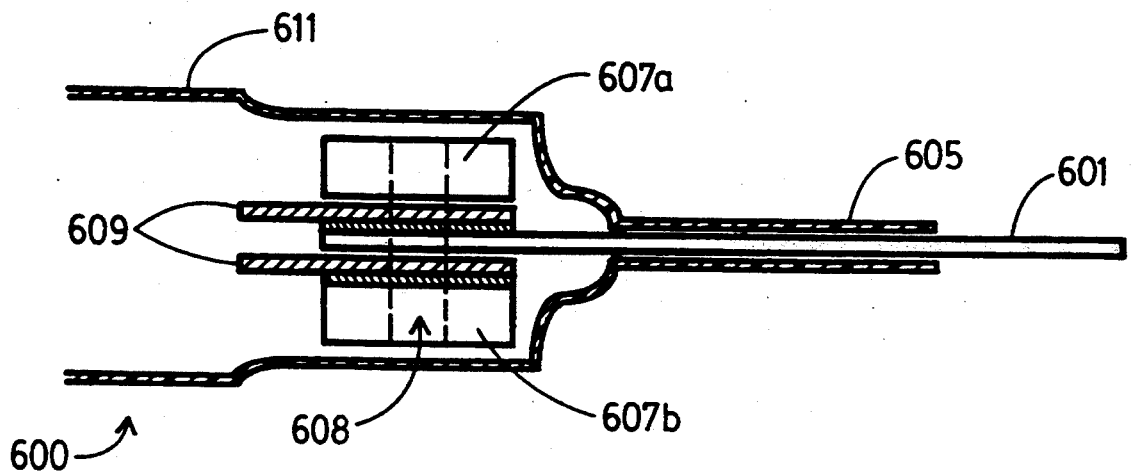
FIG._6A.
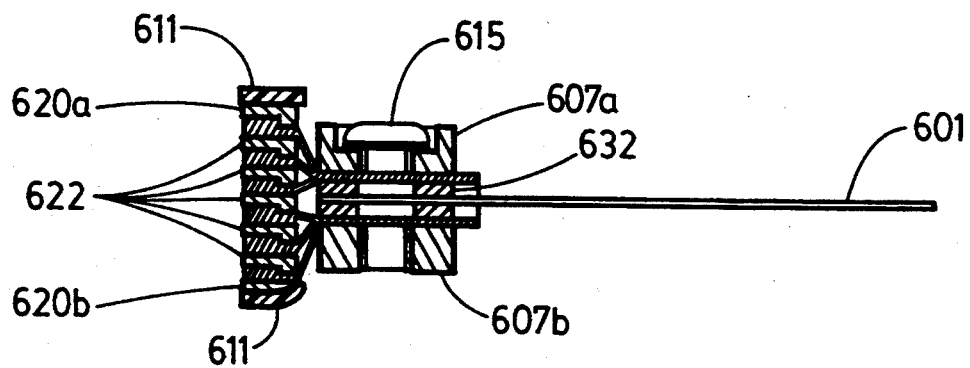
FIG._6B.
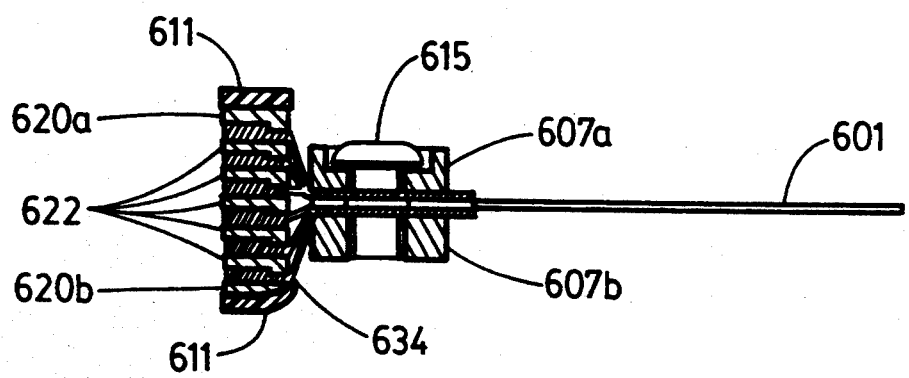
FIG._6C.

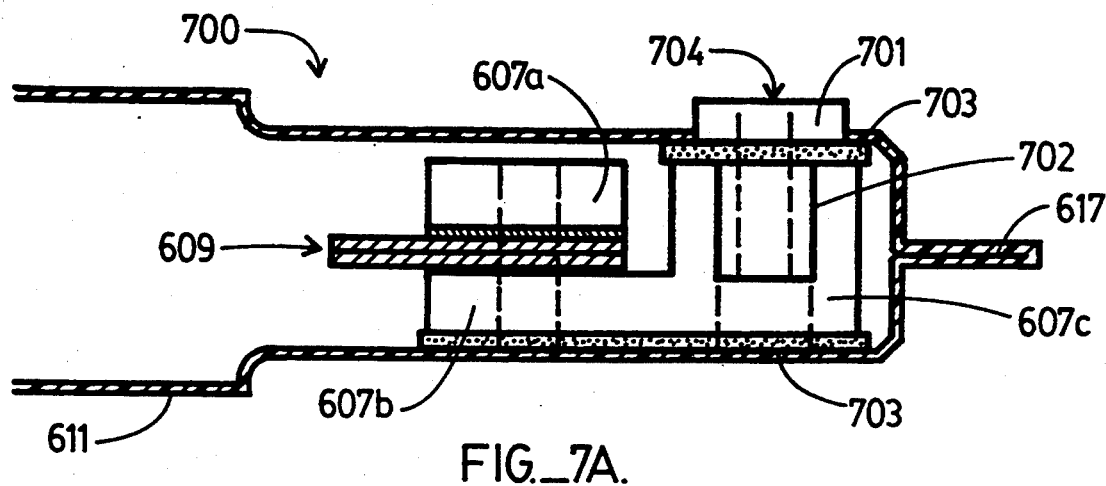
FIG._7A.
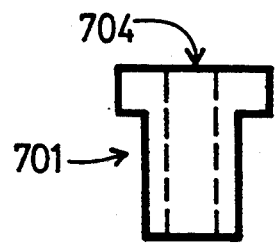
FIG._7B.
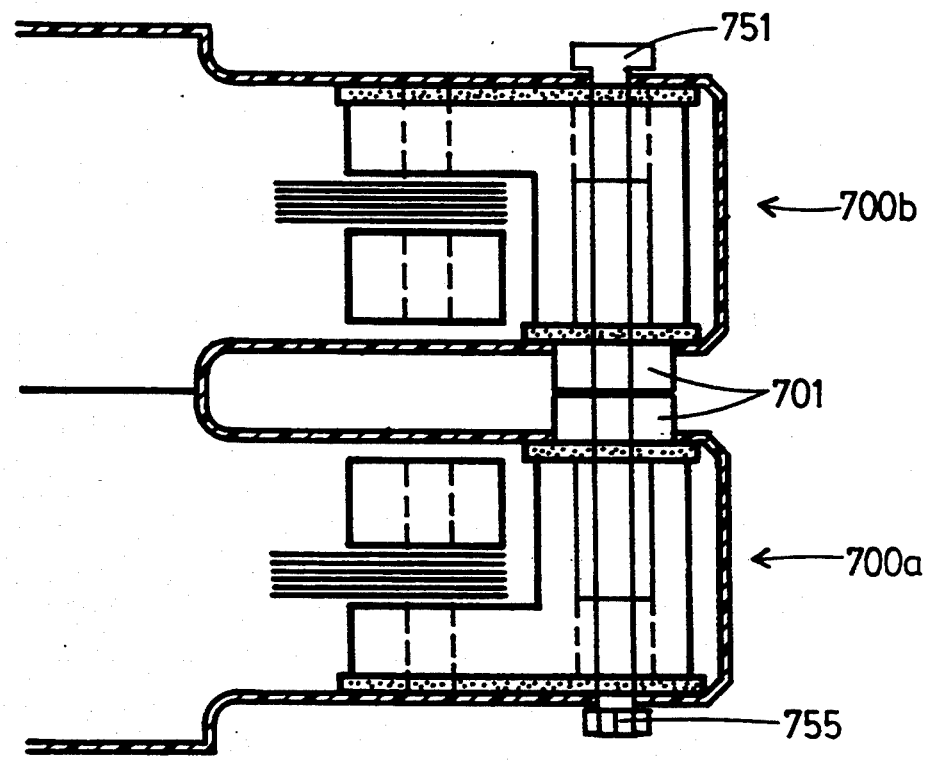
FIG._8.

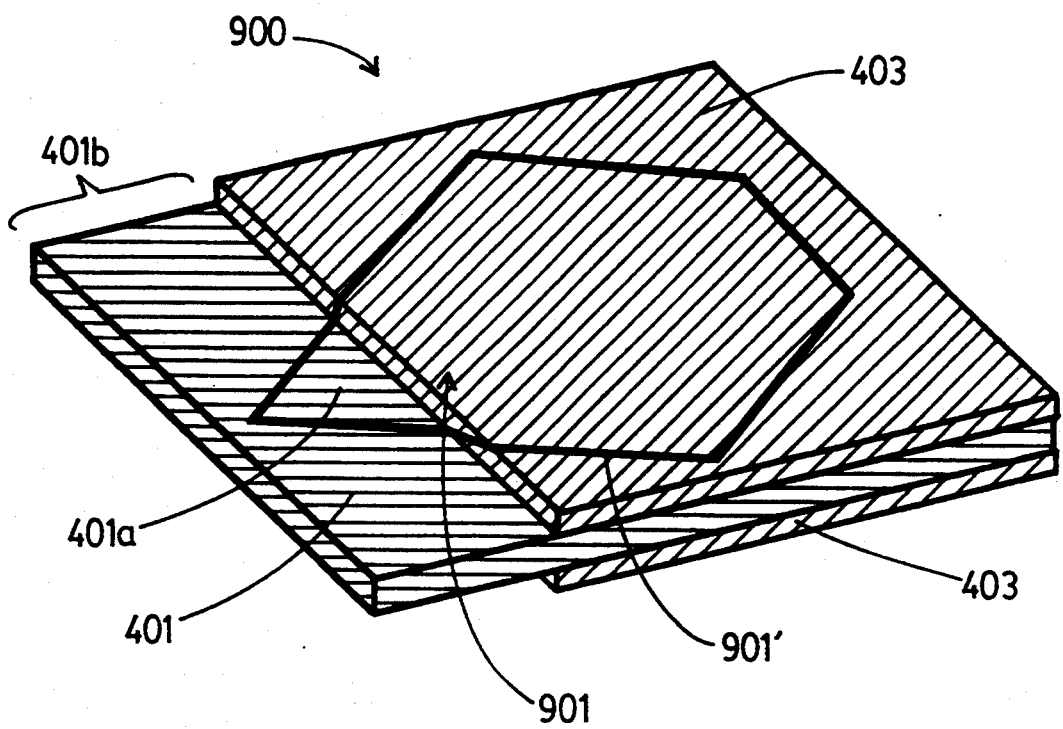
FIG._9.

CORNER TAB TERMINATION FOR FLAT-CELL BATTERIES

BACKGROUND OF THE INVENTION

1. Field of the Invention

The present invention relates to the design of battery assemblies, and more particularly to a corner tab termination design for lithium-polymer battery applications.

2. Description of the Prior Art

Presently there is a high level of interest in industry in designing thin layer solid state batteries. Such batteries are used in lap-top computers and other portable electronic devices. One particular type of thin layer solid state battery which is widely used is the lithium anode cell. The lithium anode cell comprises a lithium anode layer, a transitional metal oxide polymer composite cathode layer, and a solid or liquid electrolyte which includes a dissolved salt. Where the anode employed is made of lithium, the electrolyte would include a lithium salt. Batteries with anodes made of metals other than lithium, such as magnesium, have also been proposed.

An example of a conventional lithium flat cell battery is described in U.S. Pat. No. 4,997,732 to Austin, et al. ("Austin"), which is incorporated herein by reference in its entirety. FIGS. 3B and 5 of Austin have been incorporated as FIGS. 1 and 2 respectively in the present application, and are illustrative of the conventional lithium cell design. FIG. 2 shows a conventional bi-cell lithium battery 10. The battery body is comprised of various layers 26 shown in FIG. 1. In the center of the battery body 26 is anode assembly layer 112, which comprises a layer of lithium bonded to a layer of current collecting material. The anode current collecting material is typically copper foil. As illustrated in FIG. 1, the anode assembly layer 112 is interposed in between electrolyte layers 116. Electrolyte layers 116 are, in turn, interposed between cathode layers 120. Finally, cathode layers 120 are interposed between cathode current collector layers 124. The cathode current collector material is typically made of aluminum.

Also shown in FIG. 1 are cathode and anode terminals 134 and 132. The cathode terminal 134 is attached to cathode current collector 124. Similarly, anode terminal 132 is attached to the metal foil of anode layer 112. The layers of the battery body and the cathode and anode terminals are then packaged to form a flat bi-cell battery 10 as shown in FIG. 2.

One objective of the thin layer solid state battery shown in FIG. 2 is to be as thin and as compact as possible while at the same time maximizing the storage capacity, energy density, and shelf life of the battery. However, as shown in FIG. 2, the energy density and storage capacity of a conventional flat cell battery are not maximized since much of the battery volume is not used for housing the plurality of battery layers 26, but rather is used for housing the cathode and anode terminals 132 and 134. In addition, the proximity and location of the anode terminal relative to the cathode terminal may lead to inadvertent external short-circuit of conventional flat cell batteries.

It is therefore an objective of the present invention to maximize the storage capacity and energy density of flat cell batteries. An additional objective of the present invention is to locate the cathode and anode terminals relative to one another such that the potential for external short-circuiting is minimized.

SUMMARY OF THE INVENTION

These and additional objectives are accomplished by the various aspects of the present invention, wherein, briefly, according to a principal aspect, a new flat cell battery design is provided which incorporates a cathode and an anode terminal which are located in respective corners of the battery body. By locating the cathode and anode terminals in respective corners of the flat cell battery, the storage capacity and energy density of the battery are increased compared to conventional flat cell batteries. This is because a smaller proportion of the battery volume of the present invention is needed for housing the cathode and anode terminals.

The packaging efficiency using the design of the present invention is particularly useful in volume critical battery applications such as automotive starting and electric vehicle batteries. Anode and cathode cell terminals in typical lead-acid batteries are common to a single side. The corner terminal design of the present invention significantly improves packaging efficiency over common-edge terminals. In addition to increased volume efficiency, corner terminals improve thermal and electrical distribution properties of the battery. Physical separation of the terminals to adjacent or opposite corners also reduces the probability of inadvertent external short-circuit, resulting in improved safety.

According to one aspect of the present invention, the anode terminal is located at a first corner of the flat cell battery, and the cathode terminal is located at a second corner of the flat cell battery. The first and second corners are preferably diametrically opposed from each other. To further minimize the potential for short-circuiting, the anode terminal may preferably be located in a first corner at or near or adjacent to a first face of the battery while the cathode terminal is preferably located in a second, diametrically opposed corner at or near or adjacent to a second face of the battery body. For example, the anode terminal may be located in a first corner on the top side of the battery while the cathode terminal is located in a diametrically opposed corner on the bottom side of the battery.

Another aspect of the present invention is directed to a method for making a flat cell battery with its terminals located in the corner of the battery body. The method for making such a battery may be accomplished using one of three or more different techniques. A first method utilizes a masking process, wherein a corner portion of the current collector material is masked off before the cathode and electrolyte layers are formed on to the current collector material. After the cathode laminate layer has been formed, the mask is removed, thereby exposing a corner portion of the current collector material. A second method is to first form a complete layer of cathode laminate, and then to etch away a corner portion of the cathode and electrolyte layers to thereby expose a corner portion of the current collector material. A third method is to first form a partial cathode laminate layer by coating a portion of cathode current collector material with cathode and electrolyte layers, leaving a portion of the cathode current collector material uncoated, and then cutting out or separating a portion of the partial cathode laminate layer such that the separated portion includes a corner portion of exposed current collector material. The end result using any of the above methods will be a cathode laminate layer in which a corner portion of cathode and electrolyte material is not present, thereby exposing a corner portion of current collector material in the cathode laminate layer.

Much like the cathode laminate layer, the anode assembly layer will also be formed in a manner such that a corner portion of anode material is not present, thereby exposing a corner portion of metallic foil (anode current collector) onto which the anode material is formed. The process of forming the above-described anode assembly layer may be achieved in a number of ways. For example, the anode assembly layer may be formed by any of the techniques described above with respect to forming cathode laminate layer. Another technique is to first form the anode material layer with at least one corner missing, and then to apply this formed layer onto the anode current collector material to thereby produce a anode assembly layer with an exposed corner portion of anode current collector material.

Yet another aspect of the present invention is directed to the particular method and/or design by which each terminal is assembled. In one embodiment, a metallic plate is electrically connected to each of the exposed anode and cathode tabs, wherein each plate is positioned into a corner of the battery, thereby functioning as respective anode and cathode terminals. In a second embodiment, each of the exposed anode and cathode tabs are electrically connected to a metallic plate which includes an arm, and the arm electrically connected to a metallic plug. Each plug is located in a respective corner of the battery and thereby functions as either the anode or cathode terminal. Additional objects, features and advantages of the various aspects of the present invention will become apparent from the following description of its preferred embodiments, which description should be taken in conjunction with the accompanying drawings.

BRIEF DESCRIPTION OF THE DRAWINGS

FIG. 1 shows a cross-sectional view of a conventional flat bi-cell battery.

FIG. 2 shows a perspective view of a conventional flat cell battery after the battery has been assembled and packaged.

FIG. 3 shows a perspective view of the newly designed flat cell battery in accordance with the present invention.

FIG. 4 shows a perspective view of a cathode laminate layer which is used in forming a flat cell battery in accordance with the present invention.

FIG. 5 shows a perspective view of an anode assembly layer which is used in forming a flat cell battery in accordance with the present invention.

FIG. 6 shows a top view of one embodiment of the present invention wherein anode and cathode terminals are formed using an electrically conductive plate 601.

FIG. 6A is a cross sectional view of the embodiment of FIG. 6 taken along the line 6A.

FIG. 6B illustrates the technique of forming an anode terminal using the embodiment of FIG. 6A.

FIG. 6C illustrates the technique for forming a cathode terminal using the embodiment of FIG. 6A.

FIG. 7 shows a second embodiment of the present invention wherein anode and cathode terminals are formed using an electrically conductive plug 705.

FIG. 7A shows a cross sectional view of the embodiment of FIG. 7 taken along the line 7A.

FIG. 7B is a cross sectional view of the electrically conductive plug 701 of FIG. 7A.

FIG. 8 shows a cross sectional view of a multiple module battery wherein each of the individual battery modules is similar to the embodiment shown in FIG. 7A.

FIG. 9 illustrates a technique for forming cathode laminate layer 400 of FIG. 4.

DEFINITIONS

As used in this application, the terms "battery" or "flat cell battery" or "lithium battery" can include a single cell, or a plurality of cells connected in either series or parallel fashion to furnish electrical current. The term "cell" or "bi-cell" includes an anode layer, cathode layer, electrolyte layer, and a pair of electrically conductive terminals; or a plurality of these layers connected in bi-faced, bi-polar, or other cell configuration designs known in the art. The term "terminal" refers to the portion of the flat cell battery which is used to electrically contact and to provide power to an external electronic device. The term "tab" or "foil" refers to an exposed portion of current collector material (i.e. electrically conductive foil) of either the cathode or anode layer, as illustrated by items 401a and 501a of FIGS. 4 and 5 respectively. The term "cathode laminate material" refers to the various layers of material (such as the cathode layer and the electrolyte layer) which are deposited onto the cathode current collector material to form a cathode laminate layer as illustrated in FIG. 4. Lastly, the term "anode material" refers to the anode material (such as, for example, lithium) which is deposited onto the anode current collector material to form an anode assembly layer as illustrated in FIG. 5.

DETAILED DESCRIPTION OF THE PREFERRED EMBODIMENT

Referring first to FIG. 3, a new flat cell battery design is shown wherein battery 300 comprises an anode terminal located at a first corner of the battery, and a cathode terminal located at a second corner of the battery. The terminals of the flat cell battery of the present invention have been designed so as to fit within the corners of the battery body 300. As illustrated in FIG. 3, a preferred embodiment of the present invention includes a cathode terminal 301 located in a corner which is diametrically opposed to an anode terminal 303. However, it should be understood that the present invention is not limited to the particular embodiment shown in FIG. 3, but may also include other embodiments where the anode and cathode terminals are located in respective corners which are not diametrically opposed to each other.

In addition, FIG. 3 depicts a flat cell battery which has the shape of a rectangular polyhedron. However, other battery shapes may also be utilized, such as, for example, a cubicle battery, without departing from the scope of this invention.

The flat cell battery design of the present invention has several advantages over conventional flat cell battery designs. First, the placement of the anode and cathode terminals in the corners of the battery body helps to minimize the size of the battery package, and therefore reduces the space used within the package for housing the cathode and anode terminals. This, in turn, allows for a greater proportion of the battery package to be used for electro-chemical storage, thereby increasing the storage capacity and energy density of the battery.

Second, by physically locating the terminals in diagonally opposing corners, the chances of the external short-circuit of the terminals is reduced since there is a greater amount of distance between the two terminals of the present invention as compared to the distance between the terminals of conventional flat cell batteries. To further minimize the potential for short-circuiting, the anode terminal may be located in a first corner at or near or adjacent to a first face of the battery while the cathode terminal is located in a second, diametrically opposed corner at or near or adjacent to a second face of the battery body. For example, the anode terminal may be located in a first corner on the top side of the battery while the cathode terminal is located in a diametrically opposed corner on the bottom side of the battery.

Lastly, by locating the terminals in adjacent or opposing corners, the heat dissipation of the battery is improved. This improvement occurs as a result of the anode and cathode terminals of the present invention being spaced further apart than of those of conventional flat cell batteries. By spacing the terminals further apart from each other, the regions of intensive current flow in the battery (which occur near the terminals) are also caused to be spaced farther apart from each other. These regions of intensive current flow produce heat (which can be expressed by the equation $q=I^2R$, where q is the heat generated, I is the current flow through the region, and R is the resistance of the region). Since conventional flat cell batteries have terminals which are close to each other and along one edge (as shown in FIG. 2), the regions of intensive current flow near these terminals overlap, in turn creating zones of high heat generation in these overlapping regions. The result is a non-uniform dispersion of heat within the battery of FIG. 2, and an increased heat gradient near the terminal edge.

Using the technique of the present invention, this heat gradient is reduced since there are little or no overlapping regions of intensive current flow, and therefore little or no zones of high heat generation within the battery. Moreover, resistance R within the battery can be reduced by locating the anode and cathode terminals in diametrically opposed corners. This "symmetric" design of the present invention also allows for better electro-chemical utilization of the cell.

FIG. 3 is an illustration of a flat multi-cell battery designed and built in accordance with the present invention. One corner of the cell comprises a cathode terminal 301 while another corner of the cell comprises anode terminal 303. The remainder portion of the cell 350 comprises the various anode, cathode, and electrolyte layers used for generating electro-chemical energy.

FIGS. 4 and 5 illustrate the technique for constructing a flat cell battery in accordance with the present invention. Referring first to FIG. 4, a cathode laminate layer 400 is shown. The cathode laminate layer comprises a cathode layer of material and an electrolyte layer of material (collectively referred to as cathode laminate material and represented as layer 403) formed onto a layer of current collector material 401. Layer 401 is made from an electrically conductive material, such as, for example aluminum. The composition of each of the layers within the cathode laminate 400 is generally known to those skilled in the art and therefore will not be discussed further in this application.

Each of the cathode laminate layers of the present invention is constructed in a manner such that the finished product is similar to cathode laminate layer 400 of FIG. 4. Cathode laminate 400 is shown to have a corner portion of cathode and electrolyte layer 403 removed, thereby exposing a corner portion 401a of the current collector material 401. In the opposite corner 405', both the cathode-electrolyte layer 403 and the current collector layer 401 are removed (illustrated at 405) in order to allow the anode tab (not shown) to be exposed when the cathode and anode layers 400 and 500 are combined as described below.

FIG. 5 shows a perspective view of anode assembly layer 500 which comprises two layers of anode material 503a and 503b (such as, for example, lithium) sandwiching a layer of anode current collecting material 501, which typically is made out of a metallic foil such as, for example, copper. Anode assembly layer 500 is formed in a manner such that a corner portion 505' of layer 500 is removed to allow exposure of cathode tab 401a (not shown) when layers 400 and 500 are combined as described below. The opposite corner portion 501a shows the absence of anode layers 503a and 503b, thereby exposing a corner portion of the copper foil 501a.

After layers 400 and 500 have been formed, they are combined by stacking the layers together along dotted lines 531a and 531b. Additionally, a second cathode laminate layer similar to layer 400 is placed on top of anode assembly layer 500, with layer 403 of the second cathode laminate in contact with layer 503a of the anode assembly. The result is a flat bi-cell battery with anode assembly layer 500 sandwiched between two cathode laminate layers 400.

During this assembly, cathode and anode layers 400 and 500 are positioned such that each exposed corner portion of cathode current collector material 401a is located at a first corner while the exposed corner portion of anode copper foil 501a is located in a corner diagonally opposed from corners 401a. Additionally, during the battery assembly, a layer of mylar material (305 in FIG. 3) is deposited around the edges in between each of the cathode laminate and anode assembly layers 400 and 500.

The mylar material (or mylar mask) is used because of the edge effects created by the anode assembly and cathode laminate. Its use prolongs the life cycle of the battery and prevents the anode tab from coming into contact with the cathode laminate, thereby reducing the possibility of inadvertent short-circuit between the anode assembly and cathode laminate layers. Since the greatest potential for short-circuiting occurs where the anode tab protrudes out from two layers of cathode laminate (near the anode terminal), the mylar material is deposited in this area so as to extend past the edge of the cathode laminate, as illustrated at 305 of FIG. 3. Additional examples of the above-described mylar layer are illustrated in FIGS. 6 and 7 as item 613.

The result of above-described assembly is a flat bi-cell battery resembling the battery of FIG. 3.

There are several different processes which may be used in forming cathode laminate and anode assembly layers 400 and 500. The formation of anode assembly layer 500 is relatively straight forward. Anode layers 503a and 503b are formed directly onto the copper layer 501, forming an anode assembly similar to that shown in FIG. 5. In other words, anode layers 503a and 503b are formed onto copper layer 501 so as to expose a corner portion 501a of copper layer 501. This process of formation is possible because lithium anode layers 503a and 503b are viscous enough to retain their formed shapes before they are applied onto metallic layer 501. The other corner portion 505 of anode assembly 500 may either be formed directly as shown in FIG. 5, or, may first be formed into a typical 90 degree corner (which would include layers 503a, 503b and 501 as depicted at 505') and then the corner 505' trimmed at about a 45 degree angle to form corner portion 505 as shown in FIG. 5. Additionally, anode assembly layer 500 may be formed by any of the processes described below for forming cathode laminate layer 400.

Unlike the above-described process for forming anode assembly layer 500, formation of cathode laminate layer 400 is not quite as simple. This is because the cathode material and/or the electrolyte material within layer 403 does not have sufficient viscosity to hold its shape before it is formed onto current collector layer 401. To resolve this problem, there are at least three different techniques which may be used to form cathode laminate 400.

A first technique utilizes a masking process, wherein a corner portion 401a of the current collector material 401 is masked off before the cathode-electrolyte layer 403 is formed onto the current collector layer 401. After the cathode laminate layer has been formed, the mask is removed, thereby exposing a corner portion of the cathode current collector material 401a.

A second technique for forming cathode laminate 400 is to first form a complete cathode-electrolyte layer 403 on current collector 401. As illustrated by the dotted lines in FIG. 4, the complete formed layer of cathode laminate would be rectangular in shape, and would include corner portion 401'. After the complete cathode laminate layer has been formed, corner portion 401' of the cathode-electrolyte layer 403 is etched away to thereby expose a corner portion of the current collector material 401a.

In addition, the other corner portion 405 of the cathode laminate 400 may be formed as shown in FIG. 4 by removing corner 405' after the complete cathode laminate layer 400 has been formed. This may be done either before of after corner portion 401a has been created using either of the methods described above. The end result is a cathode laminate layer 400 which resembles that of FIG. 4.

A third technique for forming cathode laminate 400 is illustrated in FIG. 9. First, a partial cathode laminate layer 900 is formed by coating a portion of cathode current collector material 401 with cathode-electrolyte layer 403, leaving a portion of the cathode current collector material uncoated as shown at 401b. After the partial cathode laminate layer 900 is formed, a portion of the partial cathode laminate layer 901 is separated from the remainder of layer 900 along line 901' such that the separated portion 901 includes a corner portion of exposed current collector material 401a which is not covered by cathode-electrolyte layer 403. The technique used for separating portion 901 from layer 900 can be, for example, cutting out portion 901 with a sharp edge, stamping out portion 901 with a stamping tool, or other techniques known to those skilled in the art. This third technique for forming cathode laminate 400 is particularly useful for medium or low volume applications where the need to minimize waste is not as important a factor as it is in high volume applications.

After the anode assembly and cathode laminate layers 500 and 400 have been formed, they are assembled in the manner described above to form a cell or bi-cell or multi-cell battery. Each of the exposed aluminum cathode collectors 401a and copper anode collectors 501a is then welded, bonded, and/or fastened to a respective copper plate, which acts as the respective cathode or anode terminal. The welding may be either by spot welding, ultrasonic welding, or resistance welding. The fastening technique is discussed in greater detail below. For bonding, an electrically conductive adhesive may be used.

In a preferred embodiment, the groups of copper anode collectors are fastened together in parallel as shown in FIG. 6B (discussed below). The groups of aluminum cathode collectors are first welded together to reduce any resistance caused by oxide layers on the surface of each aluminum tab. The welded groups are then fastened together in parallel as shown in FIG. 6C (discussed below).

For multi-cell batteries, a number of aluminum cathode foils 401a will extend out of one corner of the battery, while a number of copper anode foils 501a will extend out of another corner of the battery. Each of the multiple anode and cathode foils are then electrically connected to a respective anode or cathode terminal using one of a number of techniques as illustrated by FIGS. 6 and 7. The result is a composite battery as illustrated in FIG. 3, which shows a plurality of cathode terminals 309 and a plurality of anode terminals 311, each being respectively connected together by fasteners 307. The fasteners extend perpendicularly through the plane of each corner terminal 301, 303, thereby physically and electrically securing together each of the respective anode and cathode terminals. The fasteners, for example, may be copper, bronze or brass bolts, or any other bolt made from a material chosen to avoid dissimilar metal junctions between the terminal and the fastener.

FIGS. 6 and 7 illustrate two different embodiments of the corner terminals of the present invention. Each of the embodiments shown in FIGS. 6 and 7 may be utilized for constructing either the anode or cathode terminal. Therefore, for purposes of simplification, the following discussion of FIGS. 6 and 7 will be limited to a discussion of how to construct a corner cathode terminal, with the understanding that the discussion is equally applicable constructing an anode corner terminal. Moreover, while FIGS. 6 through 7A illustrate different embodiments for constructing a corner terminal for flat multi-cell batteries, it is to be understood that the embodiments shown are not limited exclusively to multi-cell batteries, but may also be used in the construction of cornered terminals for single-cell batteries, as would readily be apparent to those skilled in the art.

Referring first to FIG. 6, a first embodiment of a corner terminal of the present invention is shown wherein multiple cathode current collector foils 609 are electrically connected to metallic plate 601, with the metallic plate 601 functioning as the cathode terminal of the battery 600. The embodiment of FIG. 6 may more readily be understood by referring to FIG. 6A.

FIG. 6A is a cross-sectional view of the embodiment of FIG. 6 taken along the line 6A. A plurality of exposed current collector foils 609 extend out from a plurality of cathode laminate layers (not shown). Each of the foil layers in the plurality of foil layers 609 corresponds to an exposed corner portion of current collector material 401a (FIG. 4). A metallic plate 601, which, for example, is made of copper, is interposed between the plurality of cathode foils 609. Electrical contact between the foils 609 and the copper plate 601 is insured by clamping the foils 609 and the metallic plate 601 between two additional metallic plates 607a and 607b which, for example, may also be made of copper. The plates 607a and 607b are secured together by fasteners 615 (shown in FIG. 6).

The fasteners may either be threaded bolts or rivets or other fastening devices which can be used to securely clamp together upper and lower clamp plates 607a and 607b. Where the fasteners used are rivets, through-holes are made in each of the plates into which a respective rivet is inserted. The bottom portion of each rivet (opposite its head) is then hammered into a flash or mushroom shape, thereby securing the plates together. Where the fasteners used are bolts, the bottom plate will include at least one threaded aperture into which a respective bolt is inserted and screwed in, thereby securing the plates together. A more detailed discussion of the various fastening devices discussed in this application is provided in co-pending application entitled, "FASTENER SYSTEM OF TAB BUSSING FOR BATTERIES," by inventors Drew D. Tura and David Brongiel, filed on the same day as this application, which is hereby incorporated by reference in its entirety.

Additionally shown in FIG. 6A is a portion of a vacuum sealed bag 611 which encases the entire battery except for the anode and cathode terminals, thereby providing environmental protection to the battery body. The bag is non-conductive, further providing electrostatic discharge protection to the battery. Conventional batteries have been known to use vacuum sealed bags; however, the bag illustrated in the present invention has been re-designed to allow exposure of the corner terminals 601 to the outside environment. In the embodiment shown in FIG. 6A, the bag 611 is heat sealed along portions of the top and bottom surfaces of plate 601 at 605.

The vacuum bag is made out of a nylon plus aluminum plus ethylene acrylic acetate (EAA) material. EAA is a plastic resin. Other types of plastic resin materials may be used, for example, Surlyn (a registered trademark of E. I. du Pont Nemours and Company), so long as they have similar metallic adhesive properties. The plastic resin material preferably has a sufficient level of acidity in it so that when it is applied to the metal surface, the acid is able to clean the metal surface in order for the plastic resin material to form a secure bond to the metal surface.

FIGS. 6B and 6C illustrate how anode and cathode terminals are each constructed using the technique of FIG. 6A. FIG. 6B illustrates the technique of forming an anode terminal according to the embodiment of FIG. 6A. A bi-cell 603 is encased in a stacking frame with top and bottom portions 620a and 620b. The individual anode foil layers 501a (FIG. 5) are positioned into place by a plurality of intermediate frames 622. The vacuum bag is represented as item 611. Top and bottom clamp plates are depicted as items 607a and 607b, held together by a fastener 615, which, for example, is a brass bolt. Since the fastener 615 has been standardized to accommodate either the cathode or anode terminal, additional copper spacers 632 are added to expand the thickness of the area to be clamped to match that of the cathode terminal. The spacers 632 are needed because there are typically fewer anode assembly layers in a multi-cell battery than there are cathode laminate layers.

FIG. 6C depicts many of the features of FIG. 6B, with the inclusion of ultrasonic shim welds 634 placed on the top and bottom of each group of aluminum cathode foils 401a (FIG. 4). The material used for the shim welds is preferably similar to the material used for the terminal so as to avoid dissimilar metal junctions. Such a material is, for example, copper. The ultrasonic shim welds aid in the process of welding the aluminum cathode foils to the copper plate 601. Additionally the shim welds aid in the electrical connection between each of the welded groups by reducing the resistance caused by oxide layers (which occur on the surface of each aluminum layer). The resistance of the oxide layers is reduced since the shim welds are on the top and bottom portions of each welded group, and therefore, when the welded groups are fastened together, electrical connection between the various welded groups will be made through the copper-copper shim weld junctions. Note also that spacers 632 (FIG. 6B) are not needed in the assembly of the cathode terminal for reasons discussed in the paragraph above.

Referring back to FIG. 6, a top view of the first embodiment of the corner terminal may now be described in greater detail. Bi-cell tabs 609 are shown being clamped by clamp plates 607a and 607b (not shown), which insures proper electrical connection between the bi-cell tabs 609 and the corner terminal plate 601. The clamp plates 607a and b are held together by fastener 615. The mylar mask (discussed previously) is shown to be deposited along the edges of the battery cell layers at 613. The vacuum bag is represented as item 611. The bag is sealed to itself along edges 617, and is heat sealed to the copper terminal 601 at area 605. The thickness of terminal 601 can be for example 0.012–0.015 inches.

FIG. 7 shows an alternate embodiment of the corner terminal of the present invention, a discussion of which may be facilitated by reference to FIG. 7A.

FIG. 7A shows a cross-sectional view of the embodiment of FIG. 7 taken along the line 7A. Bi-cell tabs 609 are clamped between plates 607a and 607b. Plate 607b includes an arm 607c which extends into the corner of the battery, adjacent to bi-cell tabs 609. The arm 607c includes an aperture 702 into which a metallic plug 701 is inserted. The plug 701 is illustrated in FIG. 7B. The plug makes electrical contact with arm 607c, which, in turn, makes electrical contact with bi-cell foils 609. The head of plug 701 functions as the electrical terminal of the battery. Vacuum sealed bag 611 is again used, however, this time, as shown, the bag encases the entire battery and is heat sealed to itself at ends 617. The bag is further adhered to the surface of plate 607b and arm 607c at areas 703. The adhesive shown in areas 703 is an ionomer painted onto the surface of the copper plate/arm.

A small aperture is created in the bag where plug 701 is inserted into arm 607c. Both the arm 607c and plug 701 include an aperture 704 by which to secure together multiple cells or modules (discussed below). This is illustrated in FIG. 8.

In FIG. 8, two battery cells 700a and 700b are shown being electrically and physically connected together by fastening bolt 751 and nut 755. One of the battery cells 700a is oriented in the direction similar to that shown in FIG. 7A. The other battery cell 700b is oriented upside down (compared to the orientation shown in FIG. 7A) and positioned such that the anode terminal of cell 700a is connectable with the cathode terminal of cell 700b. An electrically conductive bolt 751 is inserted into the aperture shaft 704 of the respective battery cells, and is secured on the other end by nut 755. In this manner, a number of battery cells or modules may be electrically and physically secured together in series, thereby forming a composite battery with increased voltage and energy.

Additionally, although not shown, multiple battery cells similar to cell 600 (FIG. 6A) may be electrically and physically connected together in series to form a composite battery similar to the composite battery depicted in FIG. 8. In such a composite battery, each of the anode terminals may be attached in series to a respective cathode terminal via fasteners 603 (FIG. 6) which extend perpendicularly through the plane of each corner terminal 601, thereby physically and electrically securing each of the respective anode and cathode terminals together. The result is a composite battery with increased voltage and energy. The fasteners, for example, may be copper, bronze or brass bolts, or any other bolt made from a material chosen to avoid dissimilar metal junctions between the terminal and the fastener.

Referring back to FIG. 7, a top view of the second embodiment of the corner terminal may now be described in greater detail. Bi-cell tabs 609 are clamped together by plate 607a and 607b (not shown). The plates are held together by fasteners 615. Vacuum sealed bag 611 is shown to encase the entire battery 700, where it is heat sealed to itself along edges 617. In addition, bag 611 is adhered to the surface of plate 607b and arm 607c by an ionomer coating 703. Plug 701 is shown to extend through the bag 611 and ionomer coating into arm 607c (not shown). An aperture 704 extends longitudinally through the plug 701 and arm 607c. Lastly, the mylar mask 613 is shown to be deposited along the edges between each anode assembly and cathode laminate layers, as discussed previously.

Although several preferred embodiments of this invention have been described in detail herein with reference to the accompanying drawings, it is to be understood that the invention is not limited to these precise embodiments, and that various changes and modifications may be effected therein by one skilled in the art without departing from the scope or spirit of the invention as defined in the appended claims.

It is claimed:

1. A flat cell battery comprising:
    a body having a first and second corner wherein said first and second corners are diametrically opposed form each other, said body including:
        at least one anode layer,
        at least one cathode layer,
        an anode terminal electrically connected to a portion of said at least one anode layer; and
        a cathode terminal electrically connected to a portion of said at least one cathode layer;
    said anode terminal being located at said first corner of said body and said cathode terminal being located at said second corner of said body.

2. The battery of claim 1 wherein said body is a rectangular polyhedron.

3. The battery of claim 1 wherein said body comprises a first and a second face, and
    wherein said cathode terminal is located at or near or adjacent to said first face and said anode terminal is located at or near or adjacent to said second face.

4. The battery of claim 3 wherein said first face and said second face are opposite to each other.

5. The battery of claim 1 wherein said body comprises a first face, and
    wherein said cathode terminal and said anode terminal are each located at or near or adjacent to said first face.

6. The battery of claim 1 wherein:
    said cathode terminal comprises:
        a first plate,
        a second plate, and
        a third plate,
    wherein a portion of said at least one cathode layer and a portion of said third plate are each interposed between said first and second plates, thereby causing said portion of cathode layer to make electrical contact with said third plate; and
    wherein said anode terminal comprises:
        a fourth plate,
        a fifth plate, and
        a sixth plate,
    wherein a portion of said at least one anode layer and a portion of said sixth plate are each interposed between said fourth and fifth plates, thereby causing said portion of anode layer to make electrical contact with said sixth plate.

7. The battery of claim 1,
    wherein said cathode terminal comprises:
        a first plate;
        a second plate, said second plate including an arm, said arm defining a first aperture therein; and
    wherein a portion of said at least one cathode layer is interposed between said first and second plates, thereby causing said portion of cathode layer to make electrical contact with said second plate; and
    wherein said anode terminal comprises:
        a third plate;
        a fourth plate, said fourth plate including an arm, said arm defining a second aperture therein; and
    wherein a portion of said at least one anode layer is interposed between said third and fourth plates, thereby causing said portion of anode layer to make electrical contact with said fourth plate;

8. The battery of claim 7 further comprising:
    a first plug insertable into said first aperture, thereby making electrical contact with said second plate; and
    a second plug insertable into said second aperture, thereby making electrical contact with said fourth plate.

9. The battery of claim 1 further comprising at least one layer of mylar material interposed between at least a portion of said anode layer and at least a portion of said cathode layer.

10. The battery of claim 1 further comprising a protective shell or bag sealed to at least a portion of said body for isolating said body from environmental elements.

* * * * *